US010093580B2

(12) United States Patent
Case et al.

(10) Patent No.: US 10,093,580 B2
(45) Date of Patent: *Oct. 9, 2018

(54) REFRACTORY ARTICLES AND METHODS FOR FORMING SAME

(71) Applicant: Saint-Gobain Ceramics & Plastics, Inc., Worcester, MA (US)

(72) Inventors: Allan R. Case, Worcester, MA (US); Edmund A. Cortellini, North Brookfield, MA (US); Hansong Huang, Ashland, MA (US); Melanie Kuhn, Cambridge, MA (US); Nancy F. Levoy, Concord, MA (US); Wesley S. Towle, North Grosvenordale, CT (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,002

(22) Filed: Jul. 31, 2017

(65) Prior Publication Data

US 2018/0105467 A1 Apr. 19, 2018

Related U.S. Application Data

(63) Continuation of application No. 15/167,634, filed on May 27, 2016, now Pat. No. 9,758,434.

(60) Provisional application No. 62/297,684, filed on Feb. 19, 2016, provisional application No. 62/169,240, filed on Jun. 1, 2015.

(51) Int. Cl.
*C04B 35/106* (2006.01)

(52) U.S. Cl.
CPC .... *C04B 35/106* (2013.01); *C04B 2235/3217* (2013.01); *C04B 2235/3241* (2013.01); *C04B 2235/3244* (2013.01); *C04B 2235/3418* (2013.01); *C04B 2235/3463* (2013.01); *C04B 2235/72* (2013.01); *C04B 2235/725* (2013.01); *C04B 2235/78* (2013.01); *C04B 2235/782* (2013.01); *C04B 2235/786* (2013.01); *C04B 2235/80* (2013.01); *C04B 2235/9607* (2013.01)

(58) Field of Classification Search
CPC .................................................. C04B 35/106
See application file for complete search history.

(56) References Cited

U.S. PATENT DOCUMENTS

| 3,519,447 | A | 7/1970 | Adams et al. |
|---|---|---|---|
| 3,567,473 | A | 3/1971 | Drever et al. |
| 3,632,359 | A | 1/1972 | Alper et al. |
| 3,754,950 | A | 8/1973 | Cevales |
| 4,119,472 | A | 10/1978 | Brashear, Jr. et al. |
| 4,308,067 | A | 12/1981 | Guigonis et al. |
| 4,665,040 | A | 5/1987 | Kurita et al. |
| 4,829,028 | A | 5/1989 | Seki et al. |
| 4,992,396 | A | 2/1991 | McGarry et al. |
| 5,055,433 | A | 10/1991 | Niwa et al. |
| 5,183,610 | A | 2/1993 | Brog et al. |
| 5,403,794 | A | 4/1995 | Morris et al. |
| 5,846,891 | A | 12/1998 | Son et al. |
| 6,158,248 | A | 12/2000 | Beppu |
| 6,441,520 | B1 | 8/2002 | Grant |
| 6,509,287 | B2 | 1/2003 | Boussant-Roux et al. |
| 6,576,580 | B2 | 6/2003 | Gaubil et al. |
| 6,797,203 | B2 | 9/2004 | Vlach et al. |
| 7,176,153 | B2 | 2/2007 | Anderson |
| 7,943,541 | B2 | 5/2011 | Avedikian et al. |
| 8,138,109 | B2 | 3/2012 | Takenami et al. |
| 9,758,434 | B2 * | 9/2017 | Case ..................... C04B 35/106 |
| 2009/0221415 | A1 | 9/2009 | Avedikian et al. |
| 2012/0309608 | A1 | 12/2012 | Francy et al. |
| 2016/0185666 | A1 | 6/2016 | San-Miguel et al. |
| 2016/0340220 | A1 | 11/2016 | Champion et al. |

FOREIGN PATENT DOCUMENTS

| AU | 660165 B2 | 7/1992 |
|---|---|---|
| CN | 1669980 A | 9/2005 |
| CN | 101830717 A | 9/2010 |
| CN | 102010212 A | 4/2011 |
| CN | 102659419 A | 9/2012 |
| CN | 102757253 A | 10/2012 |
| EP | 1637507 B1 | 12/2007 |
| GB | 1402988 | 8/1975 |
| GB | 1429723 | 3/1976 |
| JP | H01203262 A | 8/1989 |
| JP | H03103354 A | 4/1991 |
| JP | H05117044 A | 5/1993 |
| JP | H05294742 A | 11/1993 |
| JP | H05319912 A | 12/1993 |
| JP | H0680477 A | 3/1994 |
| JP | H0687668 A | 3/1994 |
| JP | H0832586 B2 | 3/1996 |
| JP | H1067569 A | 3/1998 |
| JP | H10101439 A | 4/1998 |
| JP | 2864088 B2 | 3/1999 |
| JP | H11240747 A | 9/1999 |
| JP | 2000095528 A | 4/2000 |
| JP | 3055331 B2 | 6/2000 |
| JP | 2000281455 A | 10/2000 |
| JP | 200114555 A | 4/2001 |
| JP | 2002220290 A | 8/2002 |

(Continued)

OTHER PUBLICATIONS

International Search Report and Written Opinion for PCT/US2016/034805, dated Sep. 6, 2016, 10 pages.
Search Report, dated 2015, 3 pages.

*Primary Examiner* — Karl E Group
(74) *Attorney, Agent, or Firm* — Abel Law Group, LLP; Thomas Osborn

(57) ABSTRACT

A refractory article can include a body including a content of alumina of at least 60 wt %, a content of silica of not greater than 20 wt %, a content of zirconia of not greater than 20 wt % for a total weight of the body. In a particular embodiment, the body includes a third phase including composite grains including mullite and zirconia. The third phase including the composite grains can be present within a range including at least 1 wt % and not greater than 35 wt % for a total weight of the body.

18 Claims, 3 Drawing Sheets

(56) References Cited

FOREIGN PATENT DOCUMENTS

| | | | |
|---|---|---|---|
| JP | 2005289723 | A | 10/2005 |
| JP | 3949951 | B2 | 7/2007 |
| JP | 2008150220 | A | 7/2008 |
| JP | 4494667 | B2 | 6/2010 |
| JP | 4838619 | B2 | 12/2011 |
| JP | 5199151 | B2 | 5/2013 |
| KR | 20010077900 | A | 8/2001 |
| KR | 20100076113 | A | 7/2010 |
| KR | 20100120175 | A | 11/2010 |
| KR | 101213241 | B1 | 12/2012 |
| WO | 1999032417 | A1 | 7/1999 |
| WO | 1999047472 | A1 | 9/1999 |
| WO | 2003043953 | A1 | 5/2003 |

\* cited by examiner

REFRACTORY ARTICLES AND METHODS FOR FORMING SAME

CROSS-REFERENCE TO RELATED APPLICATION(S)

This application is a continuation of and claims priority to U.S. patent application Ser. No. 15/167,634, filed on May 27, 2016, now U.S. Pat. No. 9,758,434, entitled "REFRACTORY ARTICLES AND METHODS FOR FORMING SAME," by Allan R. CASE et al., which application claims priority under 35 U.S.C. § 119(e) to U.S. Patent Application No. 62/169,240, filed on Jun. 1, 2015, entitled "REFRACTORY ARTICLES AND METHODS FOR FORMING SAME," by Allan R. CASE et al., and claims priority under 35 U.S.C. § 119(e) to U.S. Provisional Patent Application No. 62/297,684, filed Feb. 19, 2016, entitled "REFRACTORY ARTICLES AND METHODS FOR FORMING SAME," by Allan R. CASE et al., all of which applications are incorporated by reference herein in their entireties.

BACKGROUND

Field of the Disclosure

The present application relates in general to refractory articles.

Description of the Related Art

Refractory articles, such as pusher plates, are required to perform under harsh conditions. For instance, pusher plates can experience rapid thermal cycles between room temperature and temperatures as high as 1,400° C. to 1,500° C. within hours in a kiln. Such thermal gradients induce high thermal stresses within the refractory articles, which may cause refractory articles to deform and break due to thermal shock. As such, the industry continues to demand improved refractory articles.

BRIEF DESCRIPTION OF THE DRAWINGS

Embodiments are illustrated by way of example and are not limited in the accompanying figures.

Figure 1:
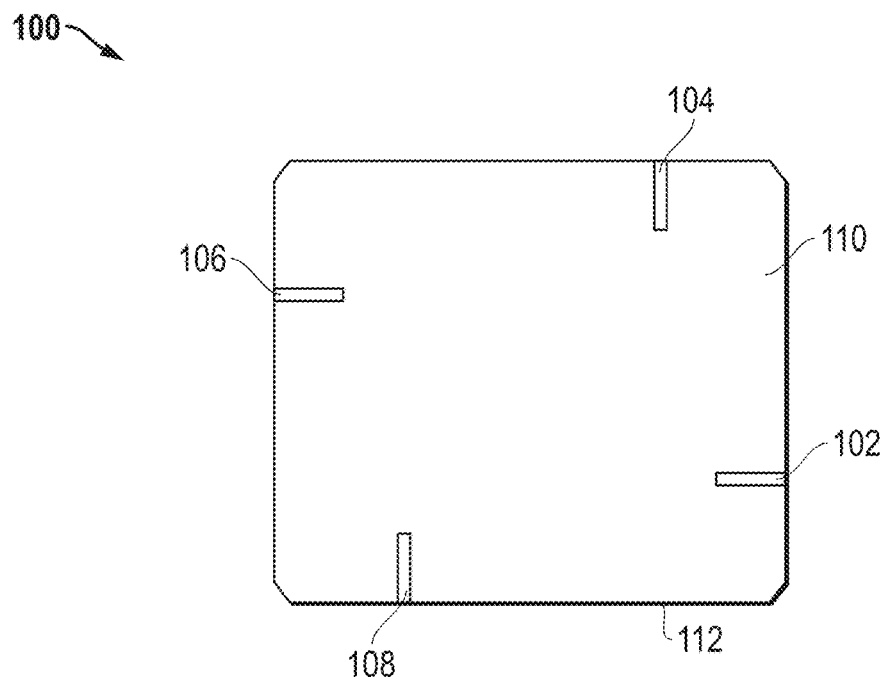
FIG. 1 includes a top view of a refractory article in accordance with embodiments herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments disclosed herein are related to refractory articles including a body including a third phase having composite grains including mullite and zirconia. Refractory articles can include articles intended to hold or support products being fired in a furnace or kiln. Some suitable examples of refractory articles can include pusher plates, saggers, batts, frames, setters, and the like. The third phase can be present within a range including at least 1 wt % and not greater than 32 wt % for a total weight of the body. The refractory articles are intended to witstand extremely harsh temperature changes and have improved dimensional stability (i.e., low growth or swelling and low warping) and resistance to break when encountering severe firing conditions, such as a temperature changes resulting from very fast push rates of 2-4 inches/min. That is, the refractory articles herein are formed to have a particular composition and/or microstructure to provide a combination of suitable thermal shock resistance and improved dimensional stability to facilitate use in severe firing conditions. More particularly, the refractory articles of the embodiments herein may be in the form of pusher plates, configured to hold articles as they are fired and such pusher plates must have suitable thermal shock resistance and dimensional stability to ensure that the products being fired are not damaged. Damage to parts during firing can represent significant losses in terms of production time and profits for a manufacturer.

The process of forming the refractory article can include a process initiated by forming a mixture of raw material powders. The mixture can include raw material powders of alumina, mullite, and a composite material including grains of mullite and zirconia. The mixture may also include some content of water and one or more binders. The mixture is mixed to a suitable homogeneity of the components and then formed into a green body using a suitable process, which may include one or more processes, such as pressing, molding, casting, extruding, or a combination thereof. As noted herein, the refractory article can be in the form of a plate, so any pressing operations may be a uniaxial or isostatic pressing operation, which may also make use of a mold. Prior to forming the green body, the mixture can be seived to remove agglomerates of a certain size.

The green body is generally formed to have a density of 3.0 g/cc to 3.3 g/cc. Moreover, the final refractory body can have a density within a range of at least 3.0 g/cc to not greater than 3.3 g/cc.

After forming, the green body is dried at a temperature in a range of 25° C. and 300° C. for a duration of 2 hours to 72 hours. After the drying process, the green body is fired in an air atmosphere at a temperature of approximately 1500° C. to 1700° C. The fired product is a refractory article having one or more of the features of the embodiments herein.

In an embodiment, the refractory article can include a body that includes a particular content of alumina to facilitate a suitable combination of thermal and dimensional stability in severe firing conditions. For example, the refractory article can include a content of alumina ($Al_2O_3$) of at least 60 wt % for a total weight of the body. For example, the content of alumina is at least 61 wt % or at least 62 wt % or at least 63 wt % or at least 64 wt % or at least 65 wt % or at least 66 wt % or at least 67 wt % or at least 68 wt % or at least 69 wt % or at least 70 wt % or at least 71 wt % or at least 72 wt % or at least 73 wt % or at least 74 wt % or at least 75 wt % or at least 76 wt % or at least 77 wt % or at least 78 wt % or at least 79 wt % or at least 80 wt % or at least 81 wt % or at least 82 wt % or at least 83 wt % or at least 84 wt % or at least 85 wt % or at least 86 wt % or at least 87 wt % or at least 88 wt % or at least 89 wt % or at least 90 wt % or at least 91 wt % or at least 92 wt % or at least 93 wt % or at least 94 wt %. In another non-limiting embodiment, the content of alumina may not be greater than 95 wt % for a total weight of the body. For instance, the content of alumina ($Al_2O_3$) in the body can be not greater than 94 wt % or not greater than 93 wt % or not greater than 92 wt % or not greater than 91 wt % or not greater than 90 wt % or not greater than 89 wt % or not greater than 88 wt % or not greater than 87 wt % or not greater than 86 wt % or not greater than 85 wt % or not greater than 84 wt % or not greater than 83 wt % or not greater than 82 wt % or not greater than 81 wt % or not greater than 80 wt % or not greater than 79 wt % or not greater than 78 wt % or not greater than 77 wt % or not greater than 76 wt % or not greater than 75 wt % or not greater than 74 wt % or not greater than 73 wt % or not greater than 72 wt % or not greater than 71 wt % or not greater than 70 wt % or not greater than 69 wt % or not greater than 68 wt % or not greater than 67 wt % or not greater than 66 wt %. It will be appreciated that the content of alumina can be within a range including any of the minimum and maximum percentages disclosed herein. For example, the content of alumina can be within a range including at least 60 wt % and not greater than 95 wt % for a total weight of the body, such as within a range including at least 65 wt % and not greater than 86 wt % or within a range including at least 88 wt % and not greater than 93 wt %.

In another embodiment, the body can include a first phase including alumina. In yet another embodiment, the first phase in the body can include alumina grains. Notably, the first phase can consist essentially of alumina grains, wherein the alumina grains consists essentially of alumina. In a particular embodiment, the alumina grains can have an average grain size (D50ag) of at least 1 micron, such as at least 2 microns or at least 3 microns or at least 5 microns or at least 10 microns or at least 20 microns or at least 50 microns or at least 80 microns or at least 100 microns or at least 200 microns or at least 300 microns or at least 400 microns or at least 500 microns or at least 600 microns or at least 700 microns or at least 800 microns or at least 900 microns or at least 1 mm In another particular embodiment, the alumina grains may have an average grain size (D50ag) of not greater than 2 mm, such as not greater than 1.5 mm or not greater than 1 mm or not greater than 900 microns or not greater than 800 microns or not greater than 700 microns or not greater than 600 microns or not greater than 500 microns. It will be appreciated that the alumina grains can have an average grain size (D50ag) within a range including at least 1 micron and not greater than 2 mm In accordance with an embodiment, the body may include silica ($SiO_2$), and more particularly, a content of silica that may facilitate improved thermal and mechanical properties as described herein . In another emboidment, silica can have a content of at least 2 wt % for a total weight of the body. For example, the content of silica ($SiO_2$) in the body can be at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 7.5 wt % or at least 8 wt % or at least 8.5 wt % or at least 9 wt % or at least 9.5 wt % or at least 10 wt % or at least 10.5 wt % or at least 11 wt % or at least 11.5 wt % or or at least 12 wt % or at least 12.5 wt % or at least 13 wt % or at least 13.5 wt % or at least 14 wt % or at least 14.5 wt % or at least 15 wt % or at least 15.5 wt % or at least 16 wt % or at least 16.5 wt % or at least 17 wt % or at least 17.5 wt % or at least 18 wt % or at least 18.5 wt % or at least 19 wt % or at least 19.5 wt %. In another non-limiting embodiment, the content of silica may not be greater than 20 wt % for a total weight of the body. For instance, the content of silica ($SiO_2$) in the body may be not greater than 19 wt % or not greater than 18.5 wt % or not greater than 18 wt % or not greater than 17.5 wt % or not greater than 17 wt % or not greater than 16.5 wt % or not greater than 16 wt % or not greater than 15.5 wt % or not greater than 15 wt % or not greater than 14.5 wt % or not greater than 14 wt % or not greater than 13.5 wt % or not greater than 13 wt % or not greater than 12.5 wt % or not greater than 12 wt % or not greater than 11.5 wt % or not greater than 11 wt % or not greater than 10.5 wt % or not greater than 10 wt % or not greater than 9.5 wt % or not greater than 9 wt % or not greater than 8.5 wt % or not greater than 8 wt % or not greater than 7.5 wt % or not greater than 7 wt % or not greater than 6.5 wt % or not greater than 6 wt % or not greater than 5.5 wt % or not greater than 5 wt % or not greater than 4.5 wt % or not greater than 4 wt % or not greater than 3.5 wt % or not greater than 3 wt % or not greater than 2.5 wt %. It will be appreciated that the content of silica can be within a range including any of the minimum and maximum percentages disclosed herein. For example, the content of silica can be within a range including at least 2 wt % and not greater than 20 wt % for a total weight of the body, such as within a range of 3 wt % to 19 wt %, within a range of 4.5 wt % to 17.5 wt %.

In accordance with an embodiment, the body can include a second phase including mullite including alumina and silica. In a further embodiment, the second phase can include mullite grains. In particular, the mullite grains can include stoichiometric mullite. Notably, the mullite grains of the second phase can be essentially free of zirconia. More particularly, the mullite grains can consist essentially of stoichiometric mullite. In still another embodiment, the mullite grains can include non-stoichiometric mullite. Moreover, essentially all of the silica in the body can be contained in the second phase, and more particularly, can be in the mullite of the mullite grains. In at least one particular embodiment, the body may not include any free silica, and more particularly, may be essentially free of free silica. Additionally or alternatively, in at least one instance, the body can be essentially free of amorphous-phases containing silica.

In a further embodiment, the mullite grains can include $3Al_2O_3.2SiO_2$, $2Al_2O_3.SiO_2$, or a combination thereof. In a particular embodiment, the mullite grains can consist essentially of $3Al_2O_3.2SiO_2$. In another particular embodiment, the mullite grains can consist essentially of $2Al_2O_3.SiO_2$.

In an embodiment, the mullite grains of the second phase can have an average grain size (D50mg) of at least 0.1 mm, such as at least 0.5 mm or at least 0.7 mm or at least 0.9 mm. In another embodiment, the mullite grains may have an average grain size (D50mg) of not greater than 3 mm, such as not greater than 2.9 mm or not greater than 2.7 mm or not greater than 2.6 mm It will be appreciated that the mullite grains can have an average grain size (D50mg) within a range including any of the minimum values and maximum values disclosed herein. For example, the mullite grains can have an average grain size (D50mg) within a range including at least 0. 1 mm and not greater than 3mm, such as within a range of 1 mm to 3 mm In an embodiment, the body can include a particular content of zirconia ($ZrO_2$), which may facilitate improved thermal and dimensional properties as described herein. In accordance with an embodiment, zirconia can have a content in the body of at least 0.1 wt % for a total weight of the body. For instance, the content of zirconia in the body is at least 0.2 wt % or at least 0.3 wt % or at least 0.5 wt % or at least 0.6 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 7.5 wt % or at least 8 wt % or at least 8.5 wt % or at least 9 wt % or at least 9.5 wt % or at least 10 wt % or at least 10.5 wt % or at least 11 wt % or at least 11.5 wt % or or at least 12 wt % or at least 12.5 wt % or at least 13 wt % or at least 13.5 wt % or at least 14 wt % or at least 14.5 wt % or at least 15 wt % or at least 15.5 wt % or at least 16 wt % or at least 16.5 wt % or at least 17 wt % or at least 17.5 wt % or at least 18 wt % or at least 18.5 wt % or at least 19 wt % or at least 19.5 wt %. In another non-limiting embodiment, the content of zirconia may not be greater than 20 wt % for a total weight of the body. For example, the content of zirconia ($ZrO_2$) in the body is not greater than 19 wt % or not greater than 18.5 wt % or not greater than 18 wt % or not greater than 17.5 wt % or not greater than 17 wt % or not greater than 16.5 wt % or not greater than 16 wt % or not greater than 15.5 wt % or not greater than 15 wt % or not greater than 14.5 wt % or not greater than 14 wt % or not greater than 13.5 wt % or not greater than 13 wt % or not greater than 12.5 wt % or not greater than 12 wt % or not greater than 11.5 wt % or not greater than 11 wt % or not greater than 10.5 wt % or not greater than 10 wt % or not greater than 9.5 wt % or not greater than 9 wt % or not greater than 8.5 wt % or not greater than 8 wt % or not greater than 7.5 wt % or not greater than 7 wt % or not greater than 6.5 wt % or not greater than 6 wt % or not greater than 5.5 wt % or not greater than 5 wt % or not greater than 4.5 wt % or not greater than 4 wt % or not greater than 3.5 wt % or not greater than 3 wt % or not greater than 2.5 wt % or not greater than 2 wt % or not greater than 1.5 wt % or not greater than 1 wt %. It will be appreciated the content of zirconia can be within a range including any of the minimum and maximum percentages disclosed herein. For example, the content of zirconia can be within a range including at least 0.1 wt % and not greater than 20 wt % for a total weight of the body, such as within a range of at least 0.1 wt % to not greater than 15 wt % or within a range of at least 0.1 wt % to not greater than 10 wt % or within a range of 0.1 wt % to not greater than 8 wt % or within a range of at least 0.1 wt % to not greater than 6 wt % wt % or within a range of at least 0.1 wt % to not greater than 4 wt % or within a range of 0.1 wt % to less than 3 wt % or even within a range of at least 0.1 wt % to not greater than 2.5 wt %.

In accordance with an embodiment, the body can include a third phase including composite grains including mullite and zirconia. The third phase can be distinct in composition and morphology from the first and second phases. In a particular embodiment, a majority of zirconia in the body can be contained in the third phase including the composite grains. For example, at least 55%, such as at least 60% or at least 65% or at least 70% or at least 75% or at least 80% or at least 85% or at least 90% or at least 95% of zirconia in the body can be contained within the third phase including the composite grains. In a more particular embodiment, essentially all of the zirconia in the body can be contained within the third phase including the composite grains. In another embodiment, the third phase can consist essentially of the composite grains. Moreover, in at least one embodiment, the composite grains can consist essentially of mullite and zirconia, and more particularly fused mullite-zirconia grains. In at least one embodiment. the composite grains can include a majority content of mullite and a minority content of zirconia. For example, the composite grains can have a substantially homogeneous dispersion of zirconia grains within the mullite grains, and more particularly, the zirconia grains can be smaller than the mullite grains within the composite grains.

In accordance with an embodiment, the composite grains can have an average grain size (D50cg) of at least 0.1 mm, such as at least 0.5 mm or at least 0.7 mm or at least 0.9 mm In another embodiment, the composite grains may have an average grain size (D50cg) of not greater than 3 mm, such as not greater than 2.9 mm or not greater than 2.7 mm or not greater than 2.5 mm It will be appreciated that the average grain size (D50cg) of the composite grains can be within a range including any of the minimum and maximum values disclosed herein. For example, the average grain size (D50cg) of the composite grains can be within a range including at least 0.1 mm and not greater than 3 mm, such as within a range of 0.5 mm to 2.9 mm or within a range of 0.7 mm to 2.7 mm or within a range of 0.9 mm to 2.5 mm In accordance with another embodiment, the third phase including the composite grains can have a content of at least 1 wt % for a total weight of the body. For instance, the content of the third phase including the composite grains can be at least 1.5 wt % or at least 2 wt % or at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 7.5 wt % or at least 8 wt % or at least 8.5 wt % or at least 9 wt % or at least 9.5 wt % or at least 10 wt % or at least 10.5 wt % or at least 11 wt % or at least 11.5 wt % or at least 12 wt % or at least 12.5 wt % or at least 13 wt % or at least 13.5 wt % or at least 14 wt % or at least 14.5 wt % or at least 15 wt % or at least 15.5 wt % or at least 16 wt % or at least 16.5 wt % or at least 17 wt % or at least 17.5 wt % or at least 18 wt % or at least 18.5 wt % or at least 19% or at least 19.5 wt % or at least 20 wt % or at least 20.5 wt % or at least 21 wt % or at least 21.5 wt % or at least 22 wt % or at least 22.5 wt % or at least 23 wt % or at least 23.5 wt % or at least 24 wt % or at least 24.5 wt % or at least 25 wt % or at least 25.5 wt % or at least 26 wt % or at least 26.5 wt % or at least 27 wt % or at least 27.5 wt % or at least 28 wt % or at least 28.5 wt % or at least 29 wt % or at least 29.5 wt % or at least 30 wt % or at least 30.5 wt % or at least 31 wt % or at least 31.5 wt % or at least 32 wt % or at least 32.5 wt % or at least 33 wt % or at least 33.5 wt % or at least 34 wt % or at least 34.5 wt % or at least 35 wt % for a total weight of the body.

In another non-limiting embodiment, the content of the third phase including the composite grains may not be greater than 35 wt % for a total weight of the body. For example, the content of the third phase may not be greater than 35 wt % or not greater than 34.5 wt % or not greater than 34 wt % or not greater than 33.5 wt % or not greater than 33 wt % or not greater than 32.5 wt % or not greater than 32 wt % or not greater than 31.5 wt % or not greater than 31 wt % or not greater than 30.5 wt % or not greater than 30 wt % or not greater than 29.5 wt % or not greater than 29 wt % or not greater than 28.5 wt % or not greater than 28 wt % or not greater than 27.5 wt % or not greater than 27 wt % or not greater than 26.5 wt % or not greater than 26 wt % or at least 25.5 wt % or at least 25 wt % or at least 24.5 wt % or not greater than 24 wt % or not greater than 23.5 wt % or not greater than 23 wt % or not greater than 22.5 wt % or not greater than 22 wt % or not greater than 21.5 wt % or not greater than 21 wt % or not greater than 20.5 wt % or not greater than 20 wt % or not greater than 19.5 wt % or not greater than 19 wt % or at least 18.5 wt % or at least 18 wt % or at least 17.5 wt % or not greater than 17 wt % or not greater than 16.5 wt % or not greater than 16 wt % or not greater than 15.5 wt % or not greater than 15 wt % or not greater than 14.5 wt % or not greater than 14 wt % or not greater than 13.5 wt % or not greater than 13 wt % or not greater than 12.5 wt % or not greater than 12 wt % or at least 11.5 wt % or at least 11 wt % or at least 10.5 wt % or not greater than 10 wt % or not greater than 9.5 wt % or not greater than 9 wt % or not greater than 8.5 wt % or not greater than 8 wt % or not greater than 7.5 wt % or not greater than 7 wt % or not greater than 6.5 wt % or not greater than 6 wt % or not greater than 5.5 wt % or not greater than 5 wt % or not greater than 4.5 wt % or not greater than 4 wt % or not greater than 3.5 wt % or not greater than 3 wt % or not greater than 2.5 wt % or not greater than 2 wt %. It will be appreciated that the content of the third phase including the composite grains can be within a range including any of the minimum and maximum percentages disclosed herein. For example, the content of the third phase including the composite grains can present within a range including at least 1 wt % and not greater than 35 wt % for a total weight of the body, such as within a range of 2 wt % to 34 wt % or within a range of 6 wt % to 28.5 wt % or within a range of 7 wt % to 25.5 wt % or within a range of 7.5 wt % to 16wt %.

In an embodiment, the body can include any of the phases of embodiments herein or any combination thereof. In a particular embodiment, the body can include the first phase including the alumina grains, the second phase including the mullite grains, and the third phase including the composite grains including mullite and zirconia. In another embodiment, the body can include a greater content of one phase as compared to other phases. For instance, the body can include a greater content of the first phase including the alumina grains compared to a content of the second phase including the mullite grains. In another instance, the body can include a greater content of the second phase including the mullite grains as compared to the content of the first phase including the alumina grains. In still another embodiment, the body can include a greater content of the first phase including the alumina grains compared to the content of the third phase including the composite grains. In yet another embodiment, the body can include a greater content of the second phase including the mullite grains compared to the content of the third phase including the composite grains. In some applications, the body can include a greater content of the third phase including the composite grains compared to a content of the first phase including the alumina grains. In some other applications, the body can include a greater content of the third phase including the composite grains compared to a content of the second phase including the mullite grains.

In accordance with an embodiment, the body can include a certain content of chromia ($Cr_2O_3$), such as particularly low contents of chromia, relative to a total weight of the body, which may facilitate improved thermal and mechanical properties as described herein. In an embodiment, the content of chromia can be greater than 0 wt % for a total weight of the body. In another embodiment, the content of chromia may not be greater than 0.01 wt %. For example, the body can be essentially free of chromia. As used herein, "essentially free" is intended to mean amounts that cannot be readily detected, or such minor amounts that do not signficiantly impact the properties of the refractory article.

In an embodiment, the body can be essentially free of certain materials, including for example, but not limited to any one or a combination of alkaline earth elements, compositions including alkaline earth elements (e.g., CaO, MgO, etc.), alkali elements, compositions including alkali elements (e.g., $K_2O$, $Na_2O$, etc.), rare-earth elements, compositions including rare-earth elements, boron, carbon, nitrogen, carbides, nitrides, silicides, borides, amorphous phases and/or compositions, free metal elements, metal alloys, intermetallics, organic materials, polymers, fibers, reinforcing materials. In most all instances, the body can include less than 0.5 wt %, such as not greater than 0.2 wt % or even not greater than 0.1 wt % for the total weight of the body of any of the foregoing materials, such that the body is essentially free of such materials.

In a further embodiment, the body can include a porosity relative to a total volume of the body. For instance, the porosity can be at least 8 vol % for a total volume of the body, such as at least 9 vol % at least 10 vol % at least 12 vol % at least 14 vol % or even at least 16 vol %. In another instance, the porosity may not be greater than 30 vol % for a total volume of the body, such as not greater than 28 vol % or not greater than 26 vol % or not greater than 24 vol % or not greater than 22 vol % or even not greater than 20 vol %. It will appreciated that the porosity can be within a range including any of the minimum and maximum percentages disclosed herein. For example, the porosity can be within a range of at least 8 vol % and not greater than 30 vol % for the total volume of the body, such as within a range of 9 vo% to 28 vol % or within a range of 12 vol % to 26 vol %.

In an embodiment, the body can include a thermal shock resistance of at least 55% of an initial MOR based on quenching a sample heated to 1000° C. into icewater. In at least one embodiment, the thermal shock resistance can be at least 60% or at least 65% or at least 70% or at least 75% or at least 77% or at least 80% or at least 82% or at least 84% or at least 86% or at least 87% or at least 88% or at least 90% or at least 92% or at least 94%. In at least one non-limiting embodiment, the thermal shock resistance may be not greater than 99% of an initial MOR.

In an embodiment, the body can be a refractory article having a length, a width, and a height, where the length-≥width≥height. In another embodiment, the body can include at least one slot formed in a major surface of the body. In a particular embodiment, the slot can intersect a side surface of the body and extends along a bottom surface of the body.

Figure 2:
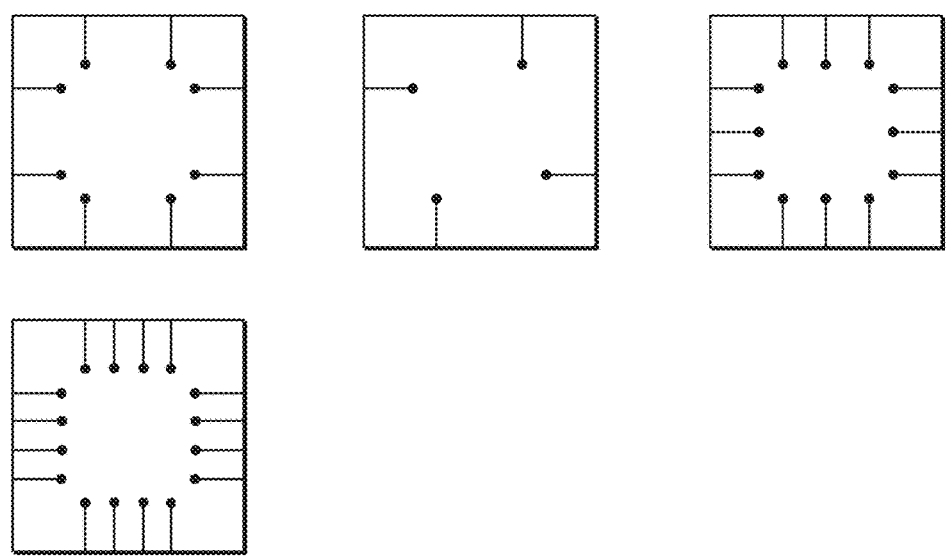
FIG. 2 includes top views of refractory articles in accordance with embodiments herein.

FIG. 1 includes a top view of a refractory article of embodiments herein. The refractory article includes a body 100 including a major surface 110, a side surface 112, and slots 102, 104, 106, and 108 disposed in the major surface 110. FIG. 2 includes top views of alternative arrangements of the slots in a refractory article of embodiments herein, where one to four or more slots can be formed along a side surface. Optionally, the tips of at least some of the slots, such as the tips illustrated in FIG. 2, can expand into a round shape, such as a sphere or a circle, to facilitate improved thermal and/or mechanical properties of the refractory article.

In accordance with an embodiment, the slot may have a particular length that may facilitate improved thermal and/or mechanical properties of the refractory article.

In an embodiment, the slot can have a length of at least 1% of a length of the body, such as, at least 3% or at least 5% or at least 8% or at least 10% or at least 15% or at least 20% or at least 25% or at least 30% or at least 35% or at least 40% or at least 45% or at least 50% of a length of the body. In another embodiment, the length of the slot may not be greater than 80% of a length of the body, or not greater than 70% or not greater than 60% or not greater than 50% or not greater than 40% or not greater than 30% or not greater than 20% or not greater than 15% or not greater than 10%. It will appreciated that the length of the slot can be within a range including any of the minimum and maximum percentages disclosed herein. For instance, the length of the slot can be within a range including at least 1% of the length of the body and not greater than 80% of the length of the body, such as within a range of 3% to 45% or within a range of 5% to 40% or within a range of 8% to 40% of a length of the body.

In accordance with another embodiment, the slot can have a width that may facilitate improved thermal and/or mechanical properties of the refractory article. For example, the width can be at least 0.5%, such as at least 1% or at least 2% or at least 3% or at least 4% or at least 5% or at least 6% or at least 7% or at least 8% or at least 9% or at least 10% of the length of the body. In still another embodiment, the width of the slot may not be greater than 50%, such as, not greater than 40% or not greater than 30% or not greater than 20% or not greater than 10% or not greater than 9% or not greater than 8% or not greater than 7% or not greater than 6% or not greater than 5% or not greater than 4% or not greater than 3% or not greater than 2% of the length of the body. It will appreciated that the width of the slot can be within a range including any of the minimum and maximum percentages disclosed herein. For instance, the width of the slot can be within a range including at least 0.5% of the length of the body and not greater than 50% of the length of the body, such as within a range of 2% to 40% or within a range of 3% to 30% or within a range of 7% to 20%.

In a further embodiment, the slot may have a particular depth that may facilitate improved thermal and/or mechanical properties of the refractory article. For example, the slot can have a depth that is a fraction of the total height of the body, such as at least 1% or at least 2% or at least 3% or at least 4% or at least 5% or at least 6% or at least 7% or at least 8% or at least 9% or at least 10% or at least 20% or at least 30% or at least 50% or at least 70% or at least 90% of the height of the body. In at least one embodiment, the slot has a depth extending for the entire height of the body (i.e., 100% of the height of the body), such that the slot is cut through the entire thickness or height of the body. In another embodiment, the depth of the slot may not be greater than 90%, such as, not greater than 80% or not greater than 70% or not greater than 60% or not greater than 50% or not greater than 40% or not greater than 30% or not greater than 20% or not greater than 10% or not greater than 8% or not greater than 5% or not greater than 2% of the height of the body. It will appreciated that the depth of the slot can be within a range including any of the minimum and maximum percentages disclosed herein. For instance, the depth of the slot can be within a range including at least 1% of the height of the body and not greater than 100% of the height of the body, such as within a range of 2% to 90% or within a range of 3% to 80% or within a range of 10% to 50%.

Figure 3:
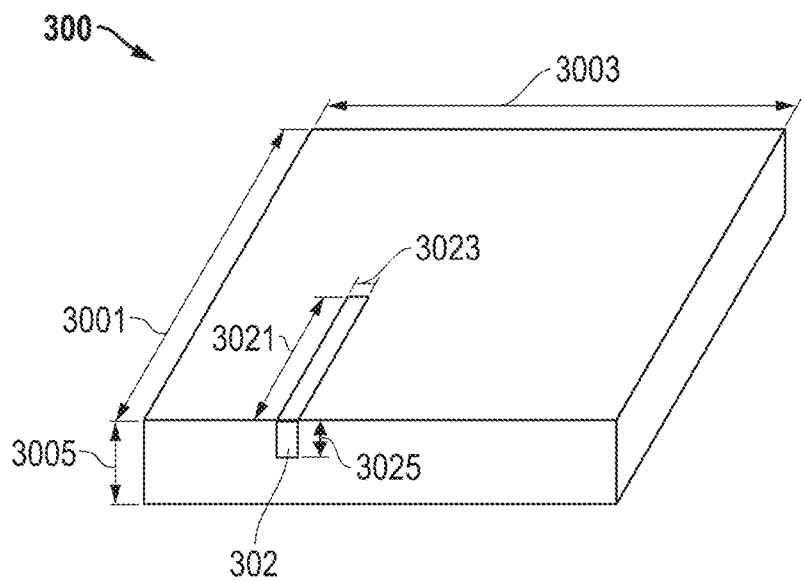
FIG. 3 includes a top view of a refractory article in accordance with embodiments herein.

FIG. 3 includes a top view of a refractory article including a body 300 and a slot 302. The body 300 has a length 3001, a width 3003, and a height 3005. The length 3001, the width 3003, and the height 3005 can be in accordance with embodiments herein. The slot 302 also has a length 3021, a width 3023, and a depth 3025. The length 3021, a width 3023, and the depth 3025 can be as disclosed above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A refractory article comprising:
a body including:
a content of alumina ($Al_2O_3$) within a range including at least 60 wt % and not greater than 95 wt % for a total weight of the body;
a content of silica ($SiO_2$) within a range including at least 2 wt % and not greater than 20 wt % for a total weight of the body;
a content of zirconia ($ZrO_2$) within a range including at least 0.1 wt % and not greater than 20 wt % for a total weight of the body;
a third phase comprising composite grains including mullite and zirconia, the third phase present within a range including at least 1 wt % and not greater than 35 wt % for a total weight of the body.

Embodiment 2. The refractory article of embodiment 1, wherein the content of alumina ($Al_2O_3$) in the body is at least 61 wt % or at least 62 wt % or at least 63 wt % or at least 64 wt % or at least 65 wt % or at least 66 wt % or at least 67 wt % or at least 68 wt % or at least 69 wt % or at least 70 wt % or at least 71 wt % or at least 72 wt % or at least 73 wt % or at least 74 wt % or at least 75 wt % or at least 76 wt % or at least 77 wt % or at least 78 wt % or at least 79 wt % or at least 80 wt % or at least 81 wt % or at least 82 wt % or at least 83 wt % or at least 84 wt % or at least 85 wt % or at least 86 wt % or at least 87 wt % or at least 88 wt % or at least 89 wt % or at least 90 wt % or at least 91 wt % or at least 92 wt % or at least 93 wt % or at least 94 wt %.

Embodiment 3. The refractory article of embodiment 1, wherein the content of alumina (Al$_2$O$_3$) in the body is not greater than 94 wt % or not greater than 93 wt % or not greater than 92 wt % or not greater than 91 wt % or not greater than 90 wt % or not greater than 89 wt % or not greater than 88 wt % or not greater than 87 wt % or not greater than 86 wt % or not greater than 85 wt % or not greater than 84 wt % or not greater than 83 wt % or not greater than 82 wt % or not greater than 81 wt % or not greater than 80 wt % or not greater than 79 wt % or not greater than 78 wt % or not greater than 77 wt % or not greater than 76 wt % or not greater than 75 wt % or not greater than 74 wt % or not greater than 73 wt % or not greater than 72 wt % or not greater than 71 wt % or not greater than 70 wt % or not greater than 69 wt % or not greater than 68 wt % or not greater than 67 wt % or not greater than 66 wt %.

Embodiment 4. The refractory article of embodiment 1, wherein the body comprises a first phase comprising the alumina.

Embodiment 5. The refractory article of embodiment 1, wherein the body comprises alumina grains.

Embodiment 6. The refractory article of embodiment 5, wherein the alumina grains have an average grain size (D50ag) within a range including at least 1 micron and not greater than 2 mm Embodiment 7. The refractory article of embodiment 1, wherein the content of silica (SiO$_2$) in the body is at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 7.5 wt % or at least 8 wt % or at least 8.5 wt % or at least 9 wt % or at least 9.5 wt % or at least 10 wt % or at least 10.5 wt % or at least 11 wt % or at least 11.5 wt % or or at least 12 wt % or at least 12.5 wt % or at least 13 wt % or at least 13.5 wt % or at least 14 wt % or at least 14.5 wt % or at least 15 wt % or at least 15.5 wt % or at least 16 wt % or at least 16.5 wt % or at least 17 wt % or at least 17.5 wt % or at least 18 wt % or at least 18.5 wt % or at least 19 wt % or at least 19.5 wt %.

Embodiment 8. The refractory article of embodiment 1, wherein the content of silica (SiO$_2$) in the body is not greater than 19 wt % or not greater than 18.5 wt % or not greater than 18 wt % or not greater than 17.5 wt % or not greater than 17 wt % or not greater than 16.5 wt % or not greater than 16 wt % or not greater than 15.5 wt % or not greater than 15 wt % or not greater than 14.5 wt % or not greater than 14 wt % or not greater than 13.5 wt % or not greater than 13 wt % or not greater than 12.5 wt % or not greater than 12 wt % or not greater than 11.5 wt % or not greater than 11 wt % or not greater than 10.5 wt % or not greater than 10 wt % or not greater than 9.5 wt % or not greater than 9 wt % or not greater than 8.5 wt % or not greater than 8 wt % or not greater than 7.5 wt % or not greater than 7 wt % or not greater than 6.5 wt % or not greater than 6 wt % or not greater than 5.5 wt % or not greater than 5 wt % or not greater than 4.5 wt % or not greater than 4 wt % or not greater than 3.5 wt % or not greater than 3 wt % or not greater than 2.5 wt %.

Embodiment 9. The refractory article of embodiment 1, wherein the body comprises a second phase comprising the mullite including alumina and silica.

Embodiment 10. The refractory article of embodiment 9, wherein the second phase comprises mullite grains.

Embodiment 11. The refractory article of embodiment 10, wherein the mullite grains comprise stoichiometric mullite, wherein the mullite grains consist essentially of stoichiometric mullite.

Embodiment 12. The refractory article of embodiment 10, wherein the mullite grains comprise 3Al$_2$O$_3$.2SiO$_2$, 2Al$_2$O$_3$.SiO$_2$, or a combination thereof.

Embodiment 13. The refractory article of embodiment 12, wherein the mullite grains consist essentially of 3Al$_2$O$_3$.2SiO$_2$.

Embodiment 14. The refractory article of embodiment 12, wherein the mullite grains consist essentially of 2Al$_2$O$_3$.SiO$_2$.

Embodiment 15. The refractory article of embodiment 12, wherein the mullite grains of the second phase are essentially free of zirconia.

Embodiment 16. The refractory article of embodiment 10, wherein the mullite grains comprise non-stoichiometric mullite.

Embodiment 17. The refractory article of embodiment 10, wherein the mullite grains have an average grain size (D50mg) within a range including at least 0.1 mm and not greater than 3 mm Embodiment 18. The refractory article of embodiment 1, wherein the content of zirconia (ZrO$_2$) in the body is at least 0.1 wt % or at least 0.2 wt % or at least 0.3 wt % or at least 0.5 wt % or at least 0.6 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 7.5 wt % or at least 8 wt % or at least 8.5 wt % or at least 9 wt % or at least 9.5 wt % or at least 10 wt % or at least 10.5 wt % or at least 11 wt % or at least 11.5 wt % or at least 12 wt % or at least 12.5 wt % or at least 13 wt % or at least 13.5 wt % or at least 14 wt % or at least 14.5 wt % or at least 15 wt % or at least 15.5 wt % or at least 16 wt % or at least 16.5 wt % or at least 17 wt % or at least 17.5 wt % or at least 18 wt % or at least 18.5 wt % or at least 19 wt % or at least 19.5 wt %.

Embodiment 19. The refractory article of embodiment 1, wherein the content of zirconia (ZrO$_2$) in the body is not greater than 19 wt % or not greater than 18.5 wt % or not greater than 18 wt % or not greater than 17.5 wt % or not greater than 17 wt % or not greater than 16.5 wt % or not greater than 16 wt % or not greater than 15.5 wt % or not greater than 15 wt % or not greater than 14.5 wt % or not greater than 14 wt % or not greater than 13.5 wt % or not greater than 13 wt % or not greater than 12.5 wt % or not greater than 12 wt % or not greater than 11.5 wt % or not greater than 11 wt % or not greater than 10.5 wt % or not greater than 10 wt % or not greater than 9.5 wt % or not greater than 9 wt % or not greater than 8.5 wt % or not greater than 8 wt % or not greater than 7.5 wt % or not greater than 7 wt % or not greater than 6.5 wt % or not greater than 6 wt % or not greater than 5.5 wt % or not greater than 5 wt % or not greater than 4.5 wt % or not greater than 4 wt % or not greater than 3.5 wt % or not greater than 3 wt % or not greater than 2.5 wt % or not greater than 2 wt % or not greater than 1.5 wt % or not greater than 1 wt %.

Embodiment 20. The refractory article of embodiment 1, wherein a majority of the zirconia in the body is contained in the third phase including the composite grains.

Embodiment 21. The refractory article of embodiment 20, wherein at least 55% of the zirconia in the body is contained within the third phase, at least 60% or at least 65% or at least or at least 70% or at leaste 75% or at least 80% or at least 85% or at least 90% or at least 95%.

Embodiment 22. The refractory article of embodiment 20, wherein essentially all of the zirconia in the body is contained within the third phase.

Embodiment 23. The refractory article of embodiment 1, wherein the third phase consists essentially of the composite grains.

Embodiment 24. The refractory article of embodiment 1, wherein the composite grains of the third phase have an average grain size (D50cg) within a range including at least 0.1 mm and not greater than 3 mm Embodiment 25. The refractory article of embodiment 1, wherein the body comprises a content of the third phase of at least 1.5 wt % or at least 2 wt % or at least 2.5 wt % or at least 3 wt % or at least 3.5 wt % or at least 4 wt % or at least 4.5 wt % or at least 5.5 wt % or at least 6 wt % or at least 6.5 wt % or at least 7 wt % or at least 7.5 wt % or at least 8 wt % or at least 8.5 wt % or at least 9 wt % or at least 9.5 wt % or at least 10 wt % or at least 10.5 wt % or at least 11 wt % or at least 11.5 wt % or at least 12 wt % or at least 12.5 wt % or at least 13 wt % or at least 13.5 wt % or at least 14 wt % or at least 14.5 wt % or at least 15 wt % or at least 15.5 wt % or at least 16 wt % or at least 16.5 wt % or at least 17 wt % or at least 17.5 wt % or at least 18 wt % or at least 18.5 wt % or at least 19wt % or at least 19.5 wt % or at least 20 wt % or at least 20.5 wt % or at least 21 wt % or at least 21.5 wt % or at least 22 wt % or at least 22.5 wt % or at least 23 wt % or at least 23.5 wt % or at least 24 wt % or at least 24.5 wt % or at least 25 wt % or at least 25.5 wt % or at least 26 wt % or at least 26.5 wt % or at least 27 wt % or at least 27.5 wt % or at least 28 wt % or at least 28.5 wt % or at least 29 wt % or at least 29.5 wt % or at least 30 wt % or at least 30.5 wt % or at least 31 wt % or at least 31.5 wt % or at least 32 wt % or at least 32.5 wt % or at least 33 wt % or at least 33.5 wt % or at least 34 wt % or at least 34.5 wt % or at least 35 wt %.

Embodiment 26. The refractory article of embodiment 1, wherein the content of mullite-zirconia in the body is not greater than 35 wt % or not greater than 34.5 wt % or not greater than 34 wt % or not greater than 33.5 wt % or not greater than 33 wt % or not greater than 32.5 wt % or not greater than 32 wt % or not greater than 31.5 wt % or not greater than 31 wt % or not greater than 30.5 wt % or not greater than 30 wt % or not greater than 29.5 wt % or not greater than 29 wt % or not greater than 28.5 wt % or not greater than 28 wt % or not greater than 27.5 wt % or not greater than 27 wt % or not greater than 26.5 wt % or not greater than 26 wt % or at least 25.5 wt % or at least 25 wt % or at least 24.5 wt % or not greater than 24 wt % or not greater than 23.5 wt % or not greater than 23 wt % or not greater than 22.5 wt % or not greater than 22 wt % or not greater than 21.5 wt % or not greater than 21 wt % or not greater than 20.5 wt % or not greater than 20 wt % or not greater than 19.5 wt % or not greater than 19 wt % or at least 18.5 wt % or at least 18 wt % or at least 17.5 wt % or not greater than 17 wt % or not greater than 16.5 wt % or not greater than 16 wt % or not greater than 15.5 wt % or not greater than 15 wt % or not greater than 14.5 wt % or not greater than 14 wt % or not greater than 13.5 wt % or not greater than 13 wt % or not greater than 12.5 wt % or not greater than 12 wt % or at least 11.5 wt % or at least 11 wt % or at least 10.5 wt % or not greater than 10 wt % or not greater than 9.5 wt % or not greater than 9 wt % or not greater than 8.5 wt % or not greater than 8 wt % or not greater than 7.5 wt % or not greater than 7 wt % or not greater than 6.5 wt % or not greater than 6 wt % or not greater than 5.5 wt % or not greater than 5 wt % or not greater than 4.5 wt % or not greater than 4 wt % or not greater than 3.5 wt % or not greater than 3 wt % or not greater than 2.5 wt % or not greater than 2 wt %.

Embodiment 27. The refractory article of embodiment 1, wherein the body comprises:
a first phase comprising alumina grains;
a second phase comprising mullite grains; and
a third phase comprising composite grains including mullite and zirconia.

Embodiment 28. The refractory article of embodiment 27, wherein the body comprises a greater content of the first phase compared to a content of the second phase.

Embodiment 29. The refractory article of embodiment 27, wherein the body comprises a greater content of the second phase as compared to a content of the first phase.

Embodiment 30. The refractory article of embodiment 27, wherein the body comprises a greater content of the first phase compared to a content of the third phase.

Embodiment 31. The refractory article of embodiment 27, wherein the body comprises a greater content of the second phase compared to a content of the third phase.

Embodiment 32. The refractory article of embodiment 27, wherein the body comprises a greater content of the third phase compared to a content of the first phase.

Embodiment 33. The refractory article of embodiment 27, wherein the body comprises a greater content of the third phase compared to a content of the second phase.

Embodiment 34. The refractory article of embodiment 27, wherein the body comprises a porosity within a range of at least 10 vol % and not greater than 30 vol % for a total volume of the body.

Embodiment 35. The refractory article of embodiment 27, wherein the body comprises a thermal shock resistance of at least 55% of an initial MOR.

Embodiment 36. The refractory article of embodiment 1, wherein the body comprises a length, a width, and a height, and wherein the length≥width>height.

Embodiment 37. The refractory article of embodiment 1, wherein the body comprises at least one slot formed in a major surface of the body.

Embodiment 38. The refractory article of embodiment 37, wherein the slot intersects a side surface of the body and extends along a bottom surface of the body.

Embodiment 39. The refractory article of embodiment 37, wherein the slot comprises a length of at least 1% of a length of the body, or at least 3% or at least 5% or at least 8% or at least 10% or at least 15% or at least 20% or at least 25% or at least 30% or at least 35% or at least 40% or at least 45% or at least 50%.

Embodiment 40. The refractory article of embodiment 37, wherein the slot comprises a length of not greater than 80% of a length of the body, or not greater than 70% or not greater than 60% or not greater than 50% or not greater than 40% or not greater than 30% or not greater than 20% or not greater than 15% or not greater than 10%.

Embodiment 41. The refractory article of embodiment 37, wherein the slot comprises a width of at least 0.5% of a length of the body, or at least 2% or at least 3% or at least 4% or at least 5% or at least 6% or at least 7% or at least 8% or at least 9% or at least 10%.

Embodiment 42. The refractory article of embodiment 37, wherein the slot comprises a width of not greater than 50% of a length of the body, or not greater than 40% or not greater than 30% or not greater than 20% or not greater than 10% or not greater than 9% or not greater than 8% or not greater than 7% or not greater than 6% or not greater than 5% or not greater than 4% or not greater than 3% or not greater than 2%.

Embodiment 43. The refractory article of embodiment 37, wherein the slot comprises a depth that is susbtantially the same as a total height of the body.

Embodiment 44. The refractory article of embodiment 37, wherein the slot comprises a depth that is at least 1% of the height of the body, or at least 2% or at least 3% or at least 4% or at least 5% or at least 6% or at least 7% or at least 8% or at least 9% or at least 10%.

Embodiment 45. The refractory article of embodiment 37, wherein the slot comprises a depth of not greater than 90% of a height of the body, or not greater than 80% or not greater than 70% or not greater than 60% or not greater than 50% or not greater than 40% or not greater than 30% or not greater than 20% or not greater than 10% or not greater than 8% or not greater than 5% or not greater than 2%.

Embodiment 46. The refractory article of embodiment 1, wherein the body is essentially free of chromia ($Cr_2O_3$).

Embodiment 47. The refractory article of embodiment 37, wherein the body is essentially free of alkaline earth elements, alkali elements, rare-earth elements, boron, carbides, nitrides, silicides, amorphous phases, free metal elements, organic materials, polymers, fibers, reinforcing materials, or a combination thereof.

Embodiment 48. The refractory article of embodiment 1, wherein the body has a density within a range of at least 3.0 g/cc to not greater than 3.3 g/cc Embodiment 49. The refractory article of embodiment 1, wherein the body has a porosity of at least 8 vol % and not greater than 30 vol %.

Example 1

Two conventional samples (each identified as Sample CS1) had 78.9% alumina, 7% silica, 13.4% zirconia, and 0 to 0.003 wt % chromia and some content of mullite-ziconia grains. The original sizes of the two conventional samples were identical. One sample was unused and the other sample was tested under several thermal cycles between 22° C. and 1,200 to 1,400° C. with rapid heating and cooling rates (2"/min push rate). After conducting the thermal cycles, the sizes of the plates were compared and it was determined that the sample exposed to the thermal cycles had significant swelling of approximately 3/16 of an inch in the dimensions of length and width.

Example 2

A conventional refractory sample (Sample CS1) is formed to have the same composition as noted above in Example 1. A refractory article according to an embodiment is formed as Sample S1. Sample S1 is formed from a mixture including seven different types of alumina having different average particle sizes from very coarse to very fine to create a suitable alumina powder with the desired particle size distribution, which is a typical refractory grain size distribution. The mixture also included mullite powder having a maximum particle size within a range between 500 microns and 5 mm, and further included fused mullite zirconia grain powder having a maximum particle size within a range between 500 microns and 5 mm Moreover, the mixture included minimal contents of water and an organic binder in contents suitable for creation of a dry mixture for use with a hydraulic press.

The mixture is seived using a large steel mesh to remove agglomerates. A suitable amount of mixture is placed in a mold of the desired size. The mixture is leveled in the mold and pressed under a force of approximately 300-900 tons for a duration of 1 to 60 seconds to form a green body. The density of the green body is checked to ensure suitable formation of the green body.

The green body is then dried in air at a temperature between room temperature and 300° C. for a duration of 2 to 72 hours. After drying, the body is fired in air at a temperature in a range of approximately 1500° C. to 1700° C. After firing, the body is cooled to form the final refractory product.

Samples CS1 and S1 are to be used in a pusher kiln with push rates as fast as 4 inches/min. The thermal shock resistance of Samples CS1 and S1 are expected to be substantially the same, however, Sample S1 is expected to have improved dimensional stability, with lower swelling and warping compared to Sample CS1.

Example 3

Another sample (Sample CS2) was prepared to have the composition as Sample CS1 as described in Example 1. Sample CS2 developed warpage after several thermal cycles between 22° C. and 1,400° C. at a push rate of 3 inches/min. Sample S1 of Example 2 is to be tested in the same conditions and is expected to demonstrate better dimensional stability with lower warpage and swelling compared to Sample CS2. Furthermore, Sample CS2 demonstrated significant cracking. Sample S1 is expected to have lower cracking compared to CS2.

Example 4

Refractory article Samples S2 to S7 according to an embodiment were formed in the same manner as described in Example 2 for forming Sample S1. The compositions of the samples are disclosed in Tabel 1 below.

TABLE 1

| | Group 1 | | | Group 2 | | | Group 3 | | |
|---|---|---|---|---|---|---|---|---|---|
| | S2 | S3 | Average | S4 | S5 | Average | S6 | S7 | Average |
| $Al_2O_3$(wt %) | 89%-91% | 89.5%-91.5% | 89%-91.5% | 87.5-90.5% | 88.5%-91.5% | 87.5%-91.5% | 86.5%-90% | 87%-90.5% | 86.5%-90.5% |
| $SiO_2$(wt %) | 7.5%-9% | 7.2%-8.5% | 7.2%-9% | 7.8%-8.3% | 7.6%-8.1% | 7.6%-8.3% | 7.1%-7.5% | 7.4%-7.7% | 7.1%-7.7% |
| $ZrO_2$(wt %) | 0.75%-0.95% | 0.75%-0.95% | 0.75%-0.95% | 1.75%-1.95% | 1.75%-1.95% | 1.75%-1.95% | 3.6%-3.95% | 3%-3.5% | 3%-3.95% |

Example 5

Refractory article samples that did not include zirconia or were targeted to have 1 wt %, 2 wt %, 4 wt %, 6 wt %, 9 wt %, and 12 wt % zirconia respectively, were formed. The compositions of the samples are disclosed in Tabel 2 below. The samples were formed in the same manner as described in Example 2. The samples were approximately up to 9 inches long and 1.25 to 1.5 inches wide. A heat-quench test was performed on the samples for various heat-and-quench cycles as disclosed in more details below.

TABLE 2

| | Sample | | | | | | |
|---|---|---|---|---|---|---|---|
| | A | B | C | D | E | F | G |
| $Al_2O_3$ | 90.6 | 90.6 | 89.9 | 88.6 | 83.95 | 83.64 | 76.7-83 |
| $SiO_2$ | 9.24 | 8.3 | 7.9 | 7.5 | 7.81 | 6.66 | 5.9-7.9 |
| $ZrO_2$ | 0 | 0.9 | 1.8 | 3.5 | 7.85 | 9.23 | 10.6-14.7 |

Figure 4:
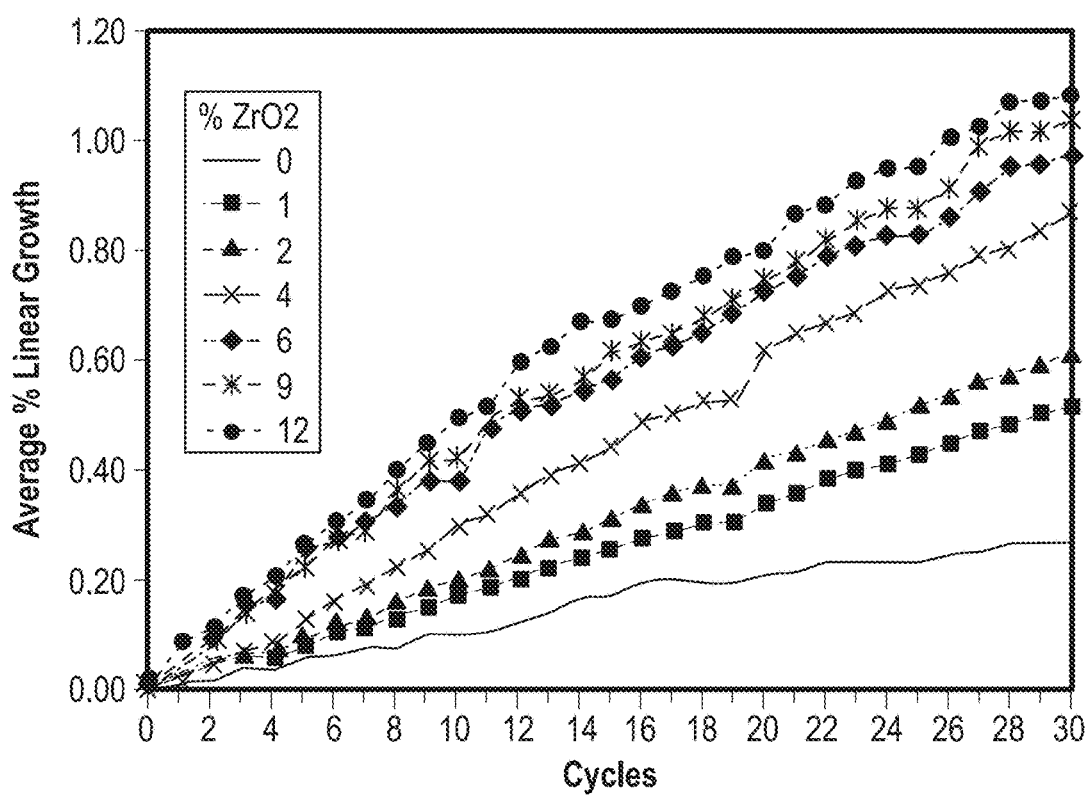
FIG. 4 includes a plot of average linear growth of refractory article samples having various contents of zirconia.

The samples were placed in a furnace, heated to 1,450° C., and soaked for 3 to 4 hours at 1,450° C. Then the samples were cooled down in the furnace. Once the temperature in the furnace was reduced to 800° C., all of the samples were removed from the furnace and placed in the air to quench the samples and cool down to room temperature before starting next cycle. The samples were treated with up to 30 heat-and-quench cycles, and the lengths of the samples were measured prior to the test and after each cycle to determine linear growth of the samples. The linear growth of each sample was determined by the formula of $LG=(L_c-L_s)/L_s \times 100\%$, where LG is liner growth for a sample after a test cycle, $L_c$ is the length measured after the cycle, and $L_s$ is the starting length of the sample prior to the test. The average linear growth was the average of linear growth for 1 to 3 samples having the same compositions, and plotted against the heat-and-quench cylce numbers and included in FIG. 4.

All of the samples demonstrated growth under thermal treatment and had increased growth with extended heat-and-quench cycles and increased contents of zirconia. For example, Sample A demonstrated minimal growth at Cycle 2, had 0.027% average linear growth at Cycle 4, and 0.26% at Cycle 30. Samples B, C, and D all had about 0.07% average linear growth at Cycle 4, but at Cycle 30, had 0.5%, 0.6%, and 0.87%, respectively. Sample A exibited least growth in each cycle compared to the other samples. Samples E to D demonstrated less growth than Samples E to G, while Sample B had less growth than Sample C, which in turn demonstrated less growth than Sample D. Sample G demonstrated highest growth compared to the other samples.

Example 6

Figure 5:
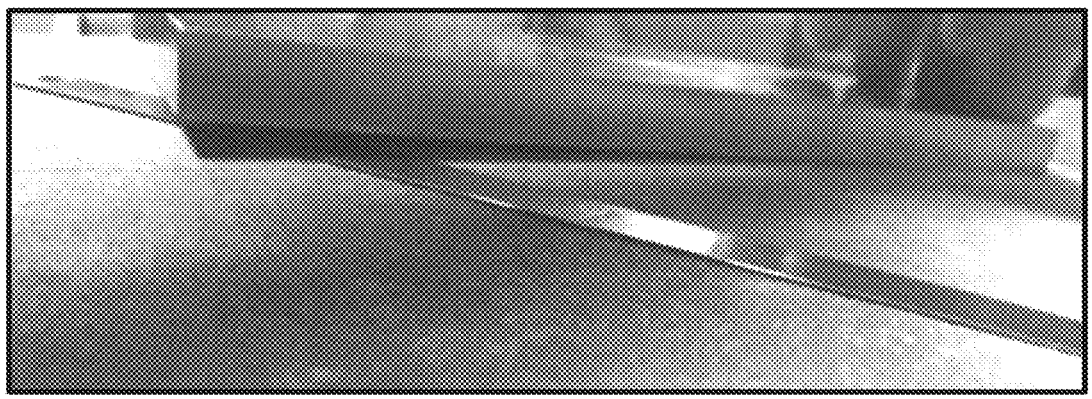
FIG. 5 includes an image of a warped sample after heat cycle treatment.

Additional pusher plate samples were formed having the composition of Sample G and a dimenstion of 12×12×1 inches. These samples were tested in a pusher kiln under several thermal cycles between 22° C. and 1,200-1,400° C. at a push rate of 3 to 4 inches/min. The samples were kept at 1,200-1,400° C. for about 30 minutes to 1 hour for each cycle. After conducting the thermal cycles, the samples developed significant warpage. An exemplary image of one of the warped samples is included in FIG. 5.

Example 7

Further refractory plate samples were formed having the compositions of Samples E and F, respectively. The original dimensions of the samples were 12×12×1 inches. The samples were tested under the same thermal cycle conditions as described in Example 6. After conducting the thermal cycles, warpage, length, and width of the samples were measured and included in Table 3.

TABLE 3

| Composition | Length (parallel to push, inches) | Width (perpendicular to push, inches) | Warpage (inches) |
|---|---|---|---|
| E | 12.188 | 12.125 | 0.052 |
| E | 12.188 | 12.156 | 0.026 |
| F | 12.188 | 12.125 | 0.038 |
| F | 12.188 | 12.125 | 0.070 |

Dimensions of the samples were measured prior to and after the thermal cycle treatment to determine the changes on lengths, widths, and diagonals of the plates. The maximum of the length, width, and diagonal changes for each sample was used as warpage in Table 3. The lengths, widths, and diagonals were measured along the surfaces of the samples using a taper gauge. It is expected that Samples B and C may provide an improved combination of the properties of dimensional stability, (e.g., low warpage) and thermal shock resistance.

The present embodiments represent a departure from the state of the art. The tests on the refractory articles of embodiments herein reveal remarkable and unexpected performance by utilization of the particular compositions and microstructures defined in the embodiments herein. It has been noted certain embodiments herein may demonstrate an improved combination of thermal properties (e.g., thermal shock resistance) and mechanical properties (e.g., dimensional stability as demonstrated by limited growth and warpage) under highly aggressive thermal cycles, allowing certain manufacturers that use refractory articles, such as pusher plates or setters, under highly aggressive thermal conditions to be able to reuse the refractory articles with improved efficiencies and throughput.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A refractory article comprising:
    a body including:
        a content of alumina ($Al_2O_3$) within a range including at least 60 wt % and not greater than 95 wt % for a total weight of the body;
        a content of silica ($SiO_2$) within a range including at least 2 wt % and not greater than 20 wt % for a total weight of the body;
        a content of zirconia ($ZrO_2$) within a range including at least 0.1 wt % and not greater than 2.5 wt % for a total weight of the body;
        a phase comprising composite grains including mullite and zirconia, the phase present within a range including at least 1 wt % and not greater than 35 wt % for a total weight of the body.

2. The refractory article of claim 1, wherein the body comprises a first phase comprising the alumina.

3. The refractory article of claim 1, wherein the body comprises alumina grains.

4. The refractory article of claim 3, wherein the alumina grains have an average grain size (D50ag) within a range including at least 1 micron and not greater than 2 mm.

5. The refractory article of claim 2, wherein the body comprises a second phase comprising mullite including alumina and silica.

6. The refractory article of claim 5, wherein the second phase comprises mullite grains.

7. The refractory article of claim 6, wherein the mullite grains comprise stoichiometric mullite.

8. The refractory article of claim 6, wherein the mullite grains comprise $3Al_2O_3.2SiO_2$, $2Al_2O_3.SiO_2$, or a combination thereof.

9. The refractory article of claim 6, wherein the mullite grains of the second phase are essentially free of zirconia.

10. The refractory article of claim 6, wherein the mullite grains comprise non-stoichiometric mullite.

11. The refractory article of claim 6, wherein the mullite grains have an average grain size (D50mg) within a range including at least 0.1 mm and not greater than 3 mm.

12. The refractory article of claim 1, wherein a majority of the zirconia in the body is contained in the phase including the composite grains.

13. The refractory article of claim 1, wherein essentially all of the zirconia in the body is contained within the phase including the composite grains.

14. The refractory article of claim 1, wherein the composite grains of the phase have an average grain size (D50cg) within a range including at least 0.1 mm and not greater than 3 mm.

15. The refractory article of claim 1, wherein the body comprises:
    a first phase comprising alumina grains;
    a second phase comprising mullite grains; and
    the third phase comprising composite grains including mullite and zirconia.

16. The refractory article of claim 1, wherein the body comprises a thermal shock resistance of at least 55% of an initial MOR.

17. The refractory article of claim 1, wherein the body comprises at least one slot formed in a major surface of the body.

18. The refractory article of claim 1, wherein the body is essentially free of chromia ($Cr_2O_3$).

* * * * *